Dec. 25, 1951

H. M. KROFT 2,579,586

ELECTRONIC PHASE SHIFTER

Filed June 15, 1949

WITNESSES:

E. A. McCloskey

[signature]

INVENTOR

Herbert M. Kroft.

BY

C. M. Avery

ATTORNEY

Patented Dec. 25, 1951

2,579,586

UNITED STATES PATENT OFFICE 2,579,586

ELECTRONIC PHASE SHIFTER

Herbert M. Kroft, Baltimore, Md., assignor to Westinghouse Electric Corporation, East Pittsburgh, Pa., a corporation of Pennsylvania Application June 15, 1949, Serial No. 99,245

9 Claims. (Cl. 250—27)

Figure 3:
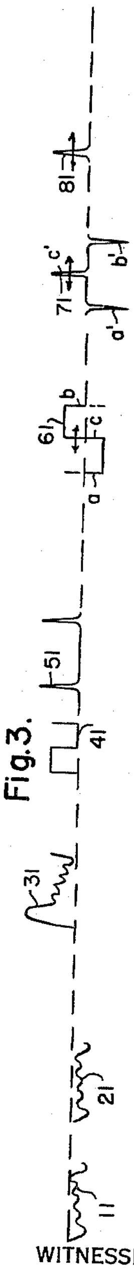

My invention relates to electronic apparatus for issuing a well defined pulse in response to the occurrence of a signal pulse and in a predetermined and adjustable time or phase relation to the signal pulse. Such apparatus are applicable for various control, cycling, or measuring purposes, for instance, for determining the phase angle and magnitude of unbalance in rotors, for the control of welding equipment, register regulators for printing presses, voltage regulators, and for the cycling of current converting equipment using thyratrons or ignitrons, and other applications involving recurrent voltage pulses.

It is an object of my invention to provide electronic phase-shift apparatus of the type mentioned that are capable of delivering a timed output pulse of definite wave shape with much less dependence upon the availability of clean input pulses as is required by known apparatus. In fact, it is a more specific aim of the invention to make the timed output pulse virtually independent of any irregularity in wave shape of the input signal and to control the issuance of the pulse only by the occurrence of the initial front of the signal.

Another object of my invention is to provide electronic phase-shift apparatus for recurrent pulses that afford an accurate shifting of the output pulse relatively to the moment of arrival of the input signal by an amount up to more than 180 cyclical degrees and much closer to a full cycle shift, i. e., 360 degrees, than is feasible in known apparatus of this type.

Still another object of my invention is to provide electronic phase-shift apparatus suitable as a device for timing or cycling fast recurring phenomena, for instance, of a frequency between 20 C. P. S. and 600 C. P. S. or more. More particularly, such a timing apparatus is intended to issue two predetermined and well defined timing pulses in response to an input signal, one pulse having a fixed phase relation to the signal and the other being accurately phase-adjustable over a wide range of the cycle period.

In one of its subsidiary aspects, it is also an object of my invention to devise an electronic phase shifter for rotor balancing equipment, capable of securing an accurately adjustable phase relation between a sine wave generator or other cyclically operating component of the equipment and an input signal controlled by the revolution or vibration of the rotor to be balanced. More particularly, it is aimed at providing a phase-shift apparatus that will reliably operate at high rotor speeds up to 30,000 R. P. M. or 36,000 R. P. M. (600 C. P. S.) or more even if the input signal is delivered from a phototube or a vibration pickup of greatly irregular output characteristic.

In order to achieve these objects, and in accordance with the invention, I provide an electronic amplifier for the reception and amplification of the input signal, and connect the amplifier to an electronic single-stroke pulse generator to obtain a sharp pulse of definite amplitude and width and of a fixed phase relation to the initial front of the signal. I deliver the pulse from the generator to an electronic time delay circuit preferably of the multivibrator type and apply the timed output voltage to another single-stroke pulse generator to obtain a sharp output pulse of definite amplitude and width whose phase relation to the input signal is determined by the selected timing adjustment of the delay circuit.

According to another feature of the invention, I combine the above-mentioned amplifier stage with a phase-selective tube circuit which permits inverting or retaining the signal polarity depending upon whether the original signal has the desired polarity.

According to another feature of the invention, I interpose between the time delay stage and the subsequent pulse generating stage a differentiator stage in order to modify the rectangular-wave output voltage of the time delay stage into positive and negative peaks more suitable for triggering the pulse generator.

The foregoing and other objects and features of my invention will be apparent from the following description in conjunction with the drawing.

Figure 1:
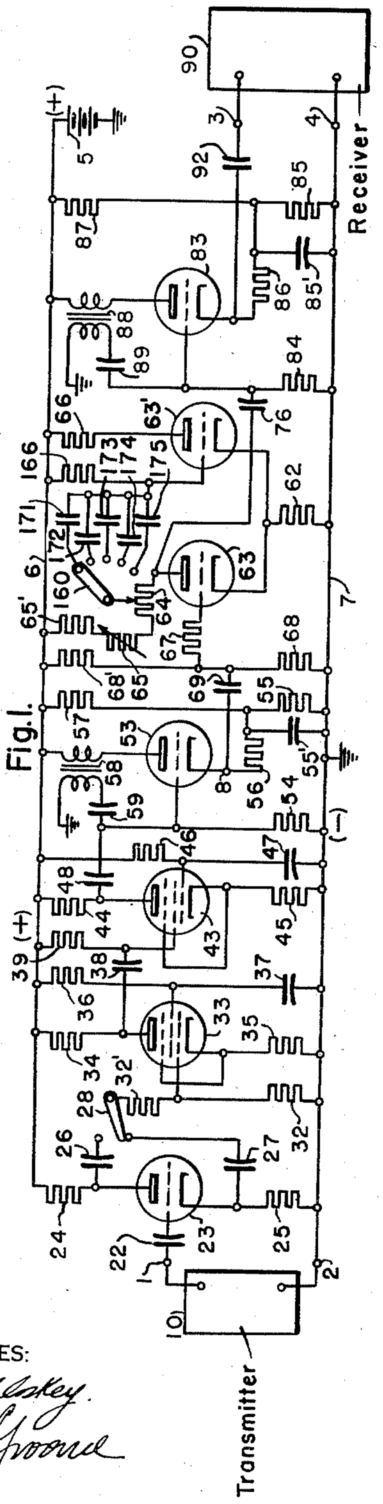
Figure 2:
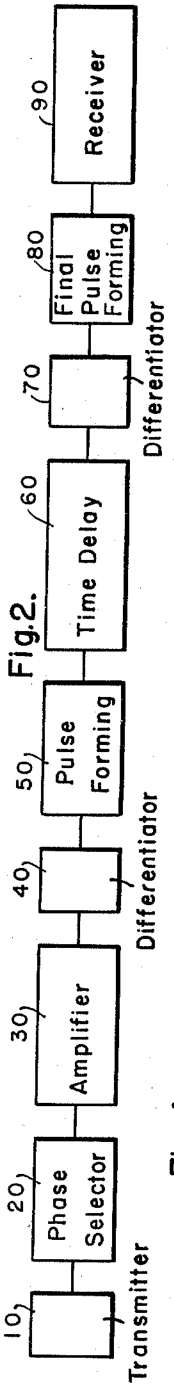
Figure 6:
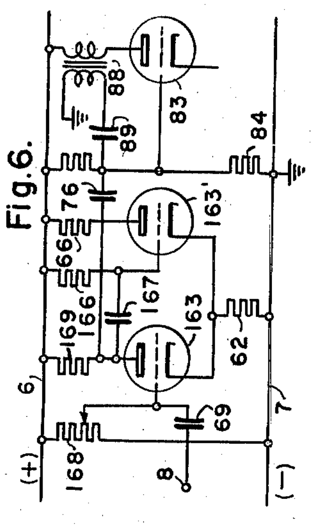
Figure 5:
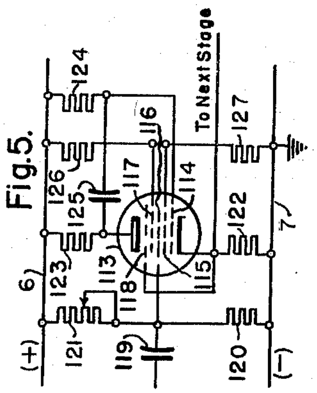
Figure 4:
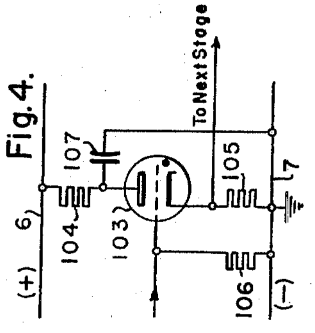

Figure 1 shows the circuit diagram of a pulse-transforming phase-shift apparatus according to the invention. A corresponding block diagram is represented in Fig. 2, while Fig. 3 shows schematically an example of typical output voltages of the respective stages of the same apparatus. Figs. 4, 5 and 6 show different modifications of individual stages applicable instead of the corresponding stages shown in Fig. 1.

In order to present a complete and detailed example of apparatus built and successfully operated in accordance with the invention, parenthetical references are given in the following to numerical impedance values and commercial type designations of suitable electronic tubes. It should be understood that these references are presented by way of example and that the numerical values should be taken mainly as indicative of orders of magnitude. As a rule, proper calibration of the impedance magnitudes is required, as customary, to obtain optimum results. The parenthetical references are chosen from a phase-shift network especially designed for controlling the sine wave generator of equipment for a balancing machine, and it is obvious that other applications may require parameter values, tubes or a number of amplifying stages different from those here exemplified.

In Fig. 1, the input terminals of the apparatus according to the invention are denoted by 1 and 2 and the output terminals by 3 and 4. The apparatus is energized from a direct-current source of constant voltage schematically shown at 5. The positive voltage bus of this source is denoted by 6. The negative bus 7 is grounded.

Connected across the input terminals is a source or transmitter 10 that furnishes the pulse to be modified by the apparatus. The source may consist of a vibration pickup, a photoelectric pulse generator, an alternating-current tachometer generator, or any other device capable of providing a voltage variation in response to a phenomenon under observation.

The apparatus according to the invention comprises a phase selector stage 20, an amplifier and sharpening stage 30, a differentiator stage 40, a pulse generator stage 50, a controlled variable time delay stage 60, a second differentiator stage 70, and a final pulse generator stage 80 (Fig. 2). Attached to the output terminals 3 and 4 is a receiver 90, i. e., a device in which the modified and properly timed output pulses from terminals 3 and 4 are to be utilized. Typical examples of output waves for the above-mentioned stages are schematically represented at 11, 21, 31, 41, 51, 61, 71 and 81, respectively (Fig. 3).

In order to mention an example of one of the different applications for which apparatus according to the invention are suitable, it may be assumed that the primary source 10 of the input pulse is a tachometer alternator or a photoelectric pulse generator used in a machine for the dynamic balancing of revolving rotors in order to provide a reference voltage of an adjustable constant phase relation to the revolution of the rotor to be tested. For this purpose, the receiver 90 may consist of an electronic sine wave generator whose sinusoidal output voltage is applied to a wattmetric measuring instrument.

More in detail, the input terminal 1 of the apparatus according to Fig. 1 is connected through a capacitor 22 with the grid of a vacuum tube 23 (6SN7) whose anode is connected through a resistor 24 with the positive bus 6 while the cathode is connected through a resistor 25 with the negative bus 7. Resistors 24 and 25 have approximately equal resistance (47,000 ohms each). Anode and cathode of tube 23 are connected through respective capacitors 26 (.01 mf.) and 27 (.01 mf.) with two contacts of a selector switch 28. The movable contact member of switch 28 is connected through resistors 32 and 32′ (each 1 megohm) to the negative bus 7 and is also in connection, through resistor 32′, with the control grid of a pentode 33 (6SJ7) of the amplifier stage 30. Switch 28 permits taking the output voltage (21, Fig. 3) of stage 20 either from across anode resistor 24 or cathode resistor 25. The triode 23 does not act as an amplifier but serves for securing a wanted polarity regardless of whether a negative or positive signal (11, Fig. 3) is impressed on the grid of the tube. In the illustrated apparatus, a positive output is desired. If a negative signal is impressed on the grid, the signal appears inverted across the anode resistor 24, and this output is used. If a positive signal is applied to the grid, it appears positive across the cathode resistor 25, and that output is used.

The amplifier stage 30 is a typical R. C. amplifier having sufficient component parts or stages to deliver a positive signal (31) of sufficient amplitude with a sharp wave front. In the preferred form, the amplifier stage consists of two tubes or tube sections, although more tubes may be used if necessary. The first amplifier tube 33, to whose control grid the switch 28 is connected, is a pentode. Its anode is connected through a load resistor 34 (470,000 ohms) to bus 6, while the cathode is connected through a resistor 35 (1,500 ohms) with the bus 7. The bias potential for the screen grid of tube 33 is applied through a resistor 36 (2.2 megohms) connected to the positive bus 6. The screen grid is bypassed by a capacitor 37 (1 mfd.) to the grounded bus 7. The anode of tube 33 is coupled through a capacitor 38 (.01 mfd.) to the grid of the second amplifier tube 43 (6SJ7) which obtains a positive bias voltage from bus 7 through a resistor 39 (1 megohm). Tube 33 acts as a normal high gain amplifier. Its output is applied to the tube 43 which sharpens the amplified signal i. e. imparts thereto a very sharp wave front. The anode of tube 43 is connected to the positive bus 6 through a resistor 44 (470,000 ohms). The cathode of tube 43 is connected to bus 7 through a resistor 45 (1,500 ohms). Screen grid potential is applied from bus 6 through a resistor 46 and bypassed by a capacitor 47 to the grounded bus 7.

Tube 43 is normally conducting. The exemplified circuit components have been selected so that the tube is operating within its normal current rating. (The potential of the control grid is approximately one-half volt positive. The potential at the anode is approximately 15 volts. The screen grid is approximately 70 volts positive.) In operation, when a signal of sufficient negative value is impressed on the control grid of tube 43, the tube is cut off. At that instant, the plate voltage rises nearly to the value of the positive voltage on bus 6. Consequently the wave shape (41 in Fig. 3) at the anode has a very steep vertical front. As a result, tube 43, in conjunction with the amplifier tube 33, converts the input signal wave pattern from a possibly very irregular wave shape to an amplified wave of a sharply defined wave front. The correlation of the latter wave to the original signal wave is only as to its starting time.

The output of the just-described amplifying and sharpening stage 30 is delivered to the grid of a vacuum tube 53 (6SN7) through the differentiating stage 40 formed by a capacitor 48 (110 mmfd.) and a resistor 54 (1 megohm). The effect of this differentiator stage is to modify the output voltage from tube 43 into pulses of the general type shown at 51 in Fig. 3 so that the grid of tube 53 is impressed by positive pips of which the first one coincides in time with the steep front of wave 41.

Tube 53 appertains to the pulse forming stage 50. This stage is essentially a single-stroke blocking oscillator. The tube 53 is biased beyond cutoff so that it is normally quiescent until a positive signal on the grid renders the tube conducting. The cutoff bias potential is applied to the grid by resistor 54 and a bleeder circuit of cathode resistors 55 (47,000 ohms) and 56 (1,000 ohms). Resistor 55 is paralleled by a capacitor 55′ (.1 mfd.) and is series-connected with a resistor 57 (.22 megohm) between buses 6 and 7. The cutoff bias voltage (20 to 50 volts) is high enough to make the tube 53 respond only to positive input peaks or steep positive wave fronts as supplied from the differentiator network 46, 54. Connected in the anode circuit of tube 53 is a transformer 58 whose secondary is coupled back to the grid of tube 53 through a capacitor 59 (270 mmfd.). When a signal received at the grid renders the tube 53 conductive, the ensuing drop in anode potential acts back through the transformer on the grid and drives the grid negative so that the tube is forced back to cutoff. Thus a single positive stroke 51 is released at the beginning of each positive grid signal, and thereafter the tube 53 is again quiescent until the reception of the next positive signal. The output voltage 51, therefore, is a single sharp pulse of extremely short duration, for instance, in the order of a few milliseconds; and the shape and magnitude of this output pulse are independent of the configuration of the signal voltage 31 releasing the pulse. The amplitude of the pulse may be varied by the choice of the circuit components such as the cathode resistors of tube 53. As regards timing, the pulse 51 coincides with the steep front of the amplified signal voltage 31.

The output pulses of the pulse generating stage 50 are fed into the time delay stage 60. In the embodiment of Fig. 1, the time delay stage is a flip-flop circuit of the common cathode-coupled multivibrator type. Two tubes 63 and 63′ have their respective cathodes coupled by a common cathode resistor 62. The tubes may be combined to a single twin triode (6SN7). The anode circuit of tube 63 includes a rheostat 64 (20,000 ohms) in series with an adjustable resistor 65 (15,000 ohms) and a fixed resistor 65′ (4,700 ohms), the anode circuit of tube 63′ includes a resistor 66 (27,000 ohms). The grid of tube 63′ receives positive grid bias through a resistor 166 and is coupled to the anode of tube 63 through the tap of rheostat 64, a selector switch 160, and a number of selective capacitors. Five such capacitors are shown at 171 to 175. These capacitors have respective graduated capacitance values (between .05 mfd. and 2,360 mmfd.). Thus the plate grid coupling within the multivibrator can be adjusted at the rheostat as well as by the selection of capacitance. The grid of tube 63 is connected through a resistor 67 (.1 megohm) to a voltage divider composed of resistors 68 (39,000 ohms) and 68′ (.24 megohm) which provides constant grid bias voltage. Since tube 63′ due to its positive grid bias is normally conducting, the load current of tube 63′, flowing through cathode resistor 62, produces across resistor 62 a voltage drop sufficient to keep tube 63 normally quiescent.

The output pulses 51 from the oscillator tube 53, applied to the grid of tube 63 through a capacitor 69 (.01 mfd.), raise the grid voltage sufficiently to start the flow of plate current. The amplified voltage is applied to the grid of tube 63′ through the coupling capacitor selected by switch 160, so that the grid voltage of tube 63′ is instantly reduced to cutoff. The current through tube 63′ ceases and the voltage across the cathode resistor 62 drops. As a result, tube 63 becomes fully conductive while tube 63′, driven beyond cutoff, remains non-conducting. Thereafter the coupling capacitor charges gradually so that the grid voltage of tube 63′ again increases in accordance with the exponential increase of the voltage across the coupling capacitor. Thus the tube 63′ becomes again conductive and, by increasing the voltage drop across the cathode resistor 62, drives the grid of tube 63 down below cutoff and restores the initial conditions.

It is apparent from the described performance of the multivibrator circuit that the switching-over or flip-flop between tubes 63 and 63′ occurs at a moment which lags that of the tripping signal an interval of time determined by the parameters of the capacitive plate-grid coupling circuit. Consequently, the time lag of the switching moment is determined by the value of the selected capacitance and the adjustment of the rheostat 64 and the values or ohmage of the other resistors in the capacitive discharge circuit. The output voltage of the delay stage between the anode of tube 63 and the common negative bus 7 has a square wave shape as exemplified at 61 in Fig. 3. The moment of occurrence of the steep front *a* of the square wave 61 is determined by the individual signal pulses 51 from the preceding pulse forming stage. Thus, if the pulse 51 occurs at constant frequency, the corresponding fronts *a* and *b* maintain a constant time spacing. However, the timing or phase position of the intermediate front *c* relative to the front *a* is determined by the flip-flop performance in the time delay stage and hence may be shifted either way relative to the wave cycle period, depending upon the selected setting of the delay stage explained in the foregoing.

The anode of tube 63 is coupled to the grid of a tube 83 (6SN7) of the final pulse generating stage by a capacitor 76. This capacitive coupling represents the above-mentioned differentiator stage 70. Its effect is to modify the output voltage of the time delay stage into pulses of the type shown at 71 in Fig. 3 so that the grid of the tube 83 is impressed by negative and positive pips. The negative pips *a′* and *b′* coincide with the front *a* and *b*, respectively, of the square wave 61 and hence have a fixed time relation to the pulses 51 or the fronts of the signal voltage 11. The positive pip *c′* of pulse 71 coincides with the intermediate front *c* of the square wave 61 and hence has an adjustable phase relative to the positive pip *a′* or *b′*.

The final pulse generating stage 80 consists of a single-stroke blocking oscillator and is similar to the pulse generating stage 50. Cutoff bias for tube 83 is supplied by a grid resistor 84 (.1 megohm) and two cathode resistors 85 (13,000 ohms) and 86 (1,100 ohms), the resistor 85 being paralleled by a capacitor 85′ (.1 mfd.) and series-connected with a resistor 87 (.22 megohm) between buses 6 and 7. The anode circuit of tube 83 includes a transformer 88 whose secondary is coupled back to the grid through a capacitor 89 (2,000 mmf.). The performance of this blocking oscillator is similar to that of the pulse generating stage 50. Consequently, the negative pip *a′* and *b′* of the pulse 71 impressed on the grid of tube 83 are ineffective, and only the positive pip *c′* triggers the oscillator thus causing it to issue a single pulse of fixed amplitude and width as exemplified at 81 in Fig. 3. This pulse is impressed across the output terminals 3, 4 on the receiving apparatus 90 through any suitable coupling means such as the coupling capacitor shown at 92 (.01 mf.).

It will be understood from the foregoing that the single-stroke output pulse 81 of the apparatus is released by the front of the input signal 11 but not affected by any irregularity in the wave shape of the input signal, and that the output pulse can be given any desired delay relative to the front of the input signal by correspondingly adjusting the time delay stage of the apparatus. The apparatus thus operates as an accurate phase shifter. For instance, if the receiver 90 is a sine wave generator and the transmitter a photoelectric pickup appertaining to equipment for the balancing of rotors, the sine wave generated under control by the output pulse 81 has an accurate phase relation to the recurrent signal pulses from the pickup, and this phase relation can be selected and shifted by adjustment of the time delay stage.

The advantages of phase shift apparatus according to the invention will be appreciated from a brief comparison with comparable devices previously suggested. In prior electronic phase shifters, the input signal is first amplified to obtain a sufficiently high and steep front, and the amplified signal is then passed through a clipping circuit to result in a modified signal of square-topped wave shape. This modified signal is then subjected to phase shifting and eventually used to control or trigger the receiving apparatus. Such a phase shift device requires a relatively clean input pulse to secure reliable and accurate operation because deep valleys occurring in the input wave subsequent to its initial front may act like a new signal and thus disturb the operation. Also, the phase shift performance is of limited accuracy and limited range if the input signal has a greatly varying amplitude. This is due to the fact that while the clipping circuit may secure a constant amplitude of the modified, i. e., clipped signal, the slope and width of the clipped signal change with varying amplitudes of the input signal, and the width of the clipped signal extends over an appreciable amount of degrees compared with the total extent (360°) of a cycle period. The variable width of the clipped signal affects the accuracy of phase adjustment, and the relatively large width of the square top of the clipped signal limits the extent of available phase shift so that shifts of more than 180° and close to 360° are difficult or infeasible to obtain.

In contrast, and as explained, the pulses applied to the time delay stage and those applied to the output circuit of apparatus according to the invention are produced by separate pulse generators independently of the wave shape of the input signal and have always a definitely defined and properly adjustable pulse shape of extremely small width. Consequently the inaccuracies and phase shift limitations due to clipped square-top waves are avoided and an extremely stable time delay is secured. In particular, the extreme sharpness of the pulses issuing from the pulse forming stages readily permit an accurate phase shift of more than 180° up to near 360° and in this respect are far superior to the known devices.

While the above-described embodiment of the invention represents a preferred design, the individual stages of the apparatus can be modified or replaced by other suitable circuit units. For instance, one or both of the pulse generating stages 50, 80 may have a biased thyratron which has a condenser connected between anode and cathode. An example of such a modified generating stage is illustrated in Fig. 4. A thyratron 103 has its anode connected through a resistor 104 to the positive bus 6. The cathode is connected to the negative bus 7 through a resistor 105. A grid resistor is denoted by 106. A capacitor 107 is connected in the anode circuit. The capacitor 107 is initially charged to a high value due to the supply voltage from buses 6 and 7. When a positive signal (31 or 71c', Fig. 3) is applied to the grid, the tube conducts, the capacitor 107 discharges, and the voltage at the anode becomes of such a value that the tube will not afford ionization. The tube is then cut off until the charging time components of the capacitor have been satisfied. The output voltage of this circuit is a short pulse similar to pulse 51 or 81 in Fig. 3.

The time delay stage 60 may be designed as a multivibrator of the phantastron type as exemplified by Fig. 5. The vibrator circuit is equipped with a pentagrid tube 113 (6SA7) whose grids are denoted by 114 to 118. Control grid 116 is coupled to the preceding pulse forming stage through a capacitor 119 which, as to its connection, corresponds to capacitor 69 in Fig. 1. Constant grid bias is applied to grid 116 from a voltage divider composed of resistors 120 and 121. The grid circuit for control grid 116 also includes a cathode resistor 122 so that the resultant grid voltage depends also upon the voltage drop caused across the cathode resistor by the flow of current in the load circuit which also includes an anode resistor 123. The control grid 114 receives a positive bias through a resistor 124 and is coupled through a capacitor 125 to the anode. The screen grids 115 and 117 are biased from a voltage divider formed by resistors 126 and 127, and the suppressor grid 118 is connected to the cathode.

The grid 114, due to its positive bias, normally permits the flow of electrons from the cathode, but the grid 116, normally biased to cutoff, prevents the flow from reaching the anode so that the electrons are collected by grids 114 and 115 and the current in the anode resistor 123 is normally zero. Hence, the anode section of the tube circuit may be thought of as a normally-off "tube" and the cathode section as a normally-on "tube" comparable to the respective tubes 63 and 63' of the multivibrator shown in Fig. 1.

When a positive pulse arrives at the control grid 116, driving this grid above cutoff, part of the electron flow from the cathode is permitted to reach the anode. This causes across anode resistor 123 a voltage drop which charges the coupling capacitor 125 and thus reduces the voltage on control grid 114 in accordance with the time characteristic of the capacitive coupling circuit. As a result, the voltage of grid 114 declines below cutoff so that the whole discharge path becomes non-conductive until the subsequent discharge of capacitor 125 again raises the grid 114 to cutoff. Then the initial tube conditions are reestablished till the arrival of another positive signal at grid 116. The amount of time delay relative to the arriving moment of the signal pulse depends upon the time constants of the tube circuits, in particular those of the capacitive coupling circuit, and can be adjusted by varying the bias on grid 116 by means of the rheostat 121. The change in timing or phase shift thus obtainable is a substantially linear function of the adjustable grid bias voltage for signal pulses of constant amplitude.

Another modification of the time delay stage 60, applicable instead of the unit shown in Fig. 1, is represented in Fig. 6 in connection with elements of the subsequent differentiator and pulse generating stages. The delay unit according to Fig. 6 is a multivibrator essentially of the same type as the one shown in Fig. 1. Thus the tubes and circuit elements denoted in Figs. 1 and 6 by the same respective numerals are similar and similarly connected with one another. In distinction from Fig. 1, however, a single capacitor 167 is used in the modification of Fig. 6 for coupling the grid of tube 163 to the anode of tube 163'. The anode resistor 169 of tube 163 in Fig. 6 has a fixed resistance, and the grid of tube 163 in Fig. 6 receives adjustable rather than constant bias voltage from a potentiometer rheostat 168 which takes the place of the resistors 68 and 68' shown in Fig. 1.

The time-delaying and phase-shifting performance of the unit shown in Fig. 6 is similar to that of the delay stage shown in Fig. 1, except that the delay is adjusted not by a change in the plate-grid coupling between tubes 163 and 163' but by the adjustment, at rheostat 168, of the constant grid bias on tube 163. If the bias voltage from rheostat 168 is decreased, the current in tube 163 during the multivibrator pulse is decreased. As a result, the anode voltage of tube 163 is higher during the pulse and the cathode voltage lower. The exponential rise of the grid voltage of tube 163', therefore, begins at a higher voltage and ends at a lower voltage, and the cutoff time of tube 163' is decreased. Thus, the multivibrator pulse is made shorter by decreasing the bias voltage at the grid of tube 163 and longer by raising this voltage.

Since apparatus according to the invention are capable, as explained, of providing a sharply defined and selectively timed output pulse in response to input impulses of any, even highly irregular, input pulses, such apparatus can satisfactorily operate from various kinds of pulse transmitters or generators regardless of the particular voltage-time characteristic of the available pulse. Such apparatus are suitable for the study of any phase of a vibrating or cyclic phenomenon. Furthermore, in many applications the detailed study of any phase of a rotating condition may be studied though initiated by a simple vibration pickup.

The apparatus may be readily used as a precision timing device by comparing the moment of occurrence of the output pulses (51 and 81) from the first and last pulse forming stages. This type of precision control allows a selection of time in microseconds to an accurate degree over a wide frequency range, including sixty cycle and other power line frequencies. For instance, the apparatus can be applied to any devices that require a fast-recurrent time control or cycling, such as thyratrons or ignitrons in welders on special rectifiers. In order to facilitate timing operations of this kind, the first pulse generating stage 50 is preferably equipped with an externally accessible output terminal. In the embodiment of Fig. 1, such a terminal, shown at 8, is attached to the cathode of tube 53. It is then possible to compare the output pulse across terminals 3 and 4 with the output pulse across terminals 8 and 4, for instance, by means of a comparator or mixer network as customary for such purposes.

Modifications and embodiments other than those specifically discussed in this disclosure will be apparent to those skilled in the art and can be applied within the essence and principles of the invention and without departure from its features as set forth in the claims annexed hereto.

I claim as my invention:

1. Electronic phase-shift apparatus, comprising an amplifier having an input circuit for receiving a signal and an output circuit for providing amplified signal voltage, a single-stroke pulse generator connected to said output circuit to be triggered by said voltage for providing a first pulse of a fixed phase position relative to said signal, a time delay stage connected to said generator and having tube circuit means for providing a voltage wave in response to said first pulse, said circuit means having an adjustable member for adjustably delaying the zero passage of said wave relative to said phase position, differentiator means connected to said time delay stage for modifying said wave into a peaked voltage, and another single-stroke pulse generator connected to said differentiator means to be triggered by said peaked voltage and having an output circuit for providing another pulse of an adjustable phase position relative to said first pulse.

2. Electronic phase-shift apparatus, comprising an electronic phase selector stage having an input circuit for receiving a signal and having an output circuit with selective switch means for transmitting the signal in a selected polarity, an amplifier connected to said output circuit, a single-stroke pulse generator connected to said amplifier to be triggered by the amplified signal for providing a pulse of given phase relation to the signal, an adjustable time delay circuit connected to said first generator, and another single-stroke pulse generator connected to said delay circuit and having output terminals for providing at said output terminals another pulse whose phase relation to said first pulse depends upon the adjustment of said delay stage.

3. Electronic phase-shift apparatus, comprising an electronic phase selector stage having an input circuit for receiving a signal and having an output circuit with selective switch means for transmitting the signal in a selected polarity, an amplifier connected to said output circuit, a single-stroke pulse generator connected to said amplifier to be triggered by the amplified signal for providing a pulse of a given phase relation to the signal, a time delay stage connected to said generator and having tube circuit means for providing a voltage wave in response to said first pulse, said circuit means having an adjustable member for adjustably delaying the zero passage of said wave relative to said phase position, differentiator means connected to said time delay stage for modifying said wave into a peaked voltage, and another single-stroke pulse generator connected to said differentiator means to be triggered by said peaked voltage and having an output circuit for providing another pulse of an adjustable phase position relative to said first pulse.

4. Electronic phase-shift apparatus, comprising an amplifier having an input circuit for receiving a signal and an output circuit for providing amplified signal voltage, an adjustable time delay stage having a rectangular-wave flip-flop generator connected to said pulse generator to be triggered by said pulse and equipped with adjustable circuit means for selectively delaying the intermediate zero passage of the wave, differentiator means connected to said flip-flop generator for modifying said wave into positive and negative peaks, and another single-stroke pulse generator connected to said differentiator means to be triggered by peaks of the one polarity coincident with said zero passages and having an output circuit for providing another pulse coincident with said zero passages.

5. Electronic phase-shift apparatus, comprising an amplifier having an input circuit for receiving a signal and an output circuit for providing amplified signal voltage, an adjustable time delay stage having a cathode-coupled multivibrator for providing a rectangular wave, said multivibrator having an input grid circuit connected to said pulse generator to be triggered by said pulse and having adjustable grid bias means connected to said grid circuit for adjustably delaying the zero passage of said wave, differentiator means connected to said multivibrator for modifying said wave into positive and negative peaks, and another single-stroke pulse generator connected to said differentiator means to be triggered by peaks of the one polarity coincident with said zero passages and having an output circuit for providing another pulse coincident with said zero passages.

6. Electronic phase-shift apparatus, comprising an amplifier having an input circuit for receiving a signal and an output circuit for providing amplified signal voltage, a multivibrator having a normally-off tube and a normally-on tube each having a cathode, an anode and a grid, said cathodes having a common cathode resistor, said normally-off tube having its grid connected to said pulse generator to be triggered in response to said pulse, an adjustable capacitive circuit coupling the anode of said normally-off tube to the grid of said normally-on tube whereby said multivibrator produces a rectangular wave whose intermediate zero passage is delayed relative to said pulse an amount dependent upon the adjustment of said coupling circuit, differentiator means connected to said multivibrator for modifying said wave into positive and negative peaks, and another single-stroke pulse generator connected to said differentiator means to be triggered by peaks of the one polarity coincident with said zero passages and having an output circuit for providing another pulse coincident with said zero passages.

7. Electronic phase-shift apparatus, comprising an amplifier having an input circuit for receiving a signal and an output circuit for providing amplified signal voltage, a blocking oscillator connected to said output circuit to be triggered by said amplified voltage for release of a pulse, a multivibrator connected to said oscillator for issuing a rectangular wave in response to said pulse and having adjustable circuit means for varying the time characteristic of said wave, and another blocking oscillator connected to said multivibrator to be controlled by said wave to issue another pulse whose phase relation to said first pulse depends upon said time characteristic.

8. Electronic phase-shift apparatus, comprising an electronic phase selector stage having an input circuit for receiving a signal and having an output circuit with selective switch means for transmiting the signal in a selected polarity, an amplifier connected to said output circuit, a blocking oscillator connected to said amplifier to release a pulse when triggered by the amplified signal, a multivibrator connected to said oscillator for issuing a rectangular wave in response to said pulse and having adjustable circuit means for varying the time characteristic of said wave, differentiator means connected to said multivibrator for modifying said wave into positive and negative peaks, and another blocking oscillator connected to said differentiator means to be triggered by a peak of given polarity for issuing another pulse whose phase relation to said first pulse depends upon said time characteristic.

9. Electronic phase-shift apparatus, comprising an amplifier having an input circuit for receiving a signal and an output circuit for providing amplified signal voltage, a blocking oscillator connected to said amplifier to release a pulse when triggered by the amplified signal, a cathode-coupled multivibrator having an electronic normally-off section and an electronic normally-on section, said normally-off section having a normally non-conducting electrode and having a control grid connected to said oscillator to become conductive in response to said pulse, said normally-on section having a control grid capacitively coupled to said electrode to become temporarily quiescent due to conductance of said electrode, said multivibrator having adjustable circuit means for variably delaying the moment at which said normally-on section becomes quiescent, and another blocking oscillator having a grid circuit capacitively coupled to said electrode for providing an output pulse at said moment.

HERBERT M. KROFT.

REFERENCES CITED

The following references are of record in the file of this patent:

UNITED STATES PATENTS

| Number | Name | Date |
|---|---|---|
| 2,408,078 | Labin et al. | Sept. 24, 1946 |
| 2,411,130 | Evans | Nov. 12, 1946 |
| 2,522,706 | Di Toro | Sept. 19, 1950 |